United States Patent
Taguchi et al.

(10) Patent No.: US 6,626,046 B2
(45) Date of Patent: Sep. 30, 2003

(54) PRESSURE-SENSITIVE RESISTOR SENSOR HAVING ELECTRODES WITH REDUCED CONTACT RESISTANCE DEVIATION

(75) Inventors: Masahiro Taguchi, Hazu-gun (JP); Eiichi Nishio, Obu (JP); Ichiro Ishiyama, Kaminiikawa-gun (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/962,265

(22) Filed: Sep. 26, 2001

(65) Prior Publication Data

US 2002/0050173 A1 May 2, 2002

(30) Foreign Application Priority Data

Oct. 30, 2000 (JP) .......................... 2000-329895

(51) Int. Cl.$^7$ ................................. G01L 9/00
(52) U.S. Cl. ........................................ 73/753; 73/754
(58) Field of Search ................ 73/754, 727, 706, 73/721, 862.041–862.046; 338/42

(56) References Cited

U.S. PATENT DOCUMENTS

| | | | | |
|---|---|---|---|---|
| 3,972,733 A | * | 8/1976 | Kamei et al. | 136/263 |
| 4,519,255 A | * | 5/1985 | Ishii | 73/727 |
| 5,054,323 A | * | 10/1991 | Hubbard et al. | 73/754 |
| 6,155,120 A | * | 12/2000 | Taylor | 73/862.046 |
| 6,216,545 B1 | * | 4/2001 | Taylor | 73/862.046 |
| 6,216,546 B1 | * | 4/2001 | Bahr | 73/862.046 |

FOREIGN PATENT DOCUMENTS

| JP | A-60-35427 | 2/1985 |
|---|---|---|
| JP | B2-2576571 | 11/1996 |
| JP | A-2000-88670 | 3/2000 |

* cited by examiner

*Primary Examiner*—Edward Lefkowitz
*Assistant Examiner*—Alandra N. Ellington
(74) *Attorney, Agent, or Firm*—Posz & Bethards, PLC (57) ABSTRACT

It is the objective of this invention to reduce deviation in contact resistance variation between electrodes among pressure-sensitive resistor sensors. The sensor is composed of a pair of films. One film has a plurality of electrode portions extending in a certain direction and the other film has at least one electrode portion that is arranged in a transverse relation with a plural of the electrode portions on the other film. Contact points generated by applied pressure are limited to crossing points between the electrode portions of the pair of films. As a result, variation in contact resistance due to applied pressure shift becomes more constant. Thus, it is possible to reduce deviation of contact resistance between the electrodes among sensors.

19 Claims, 12 Drawing Sheets

PRESSURE-SENSITIVE RESISTOR SENSOR HAVING ELECTRODES WITH REDUCED CONTACT RESISTANCE DEVIATION

CROSS REFERENCE TO RELATED APPLICATION

This application is based on and incorporates herein by reference Japanese Patent Application No. 2000-329895 filed on October 30, 2000.

BACKGROUND OF THE INVENTION

The present invention relates to a pressure-sensitive resistor sensor for detecting pressure applied thereto.

Figure 3:
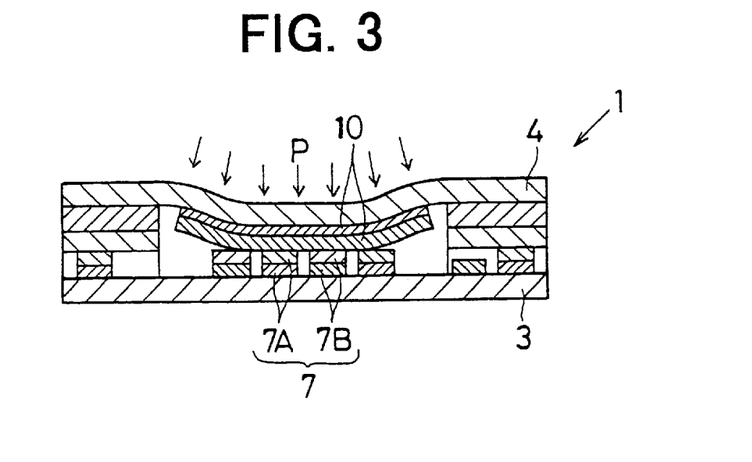
FIG. 3 is a cross-sectional view showing operation of the first embodiment.
Figure 19:
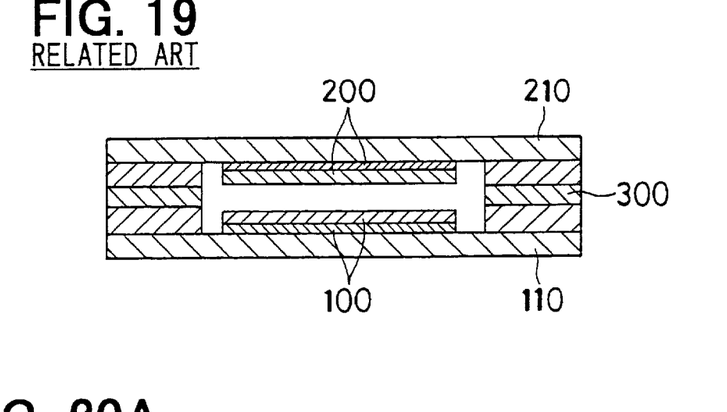
FIG. 19 is a cross-sectional view showing a pressure-sensitive resistor sensor according to a related art.
Figure 20A:
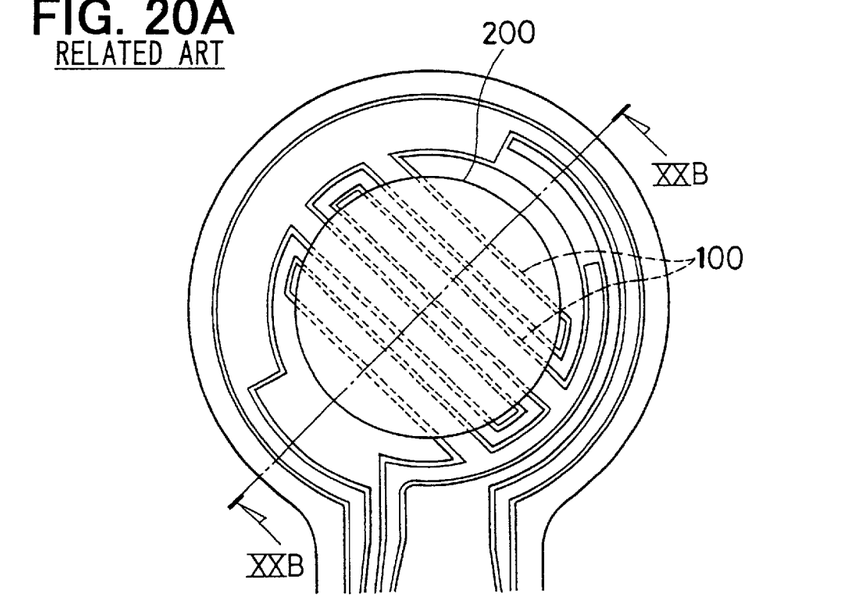
FIG. 20A is a plan view showing a pressure-sensitive resistor sensor according to another related art.
Figure 20B:
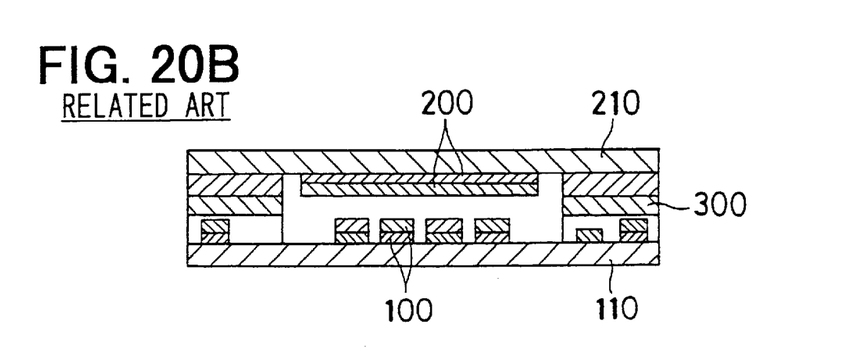
FIG. 20B is a cross-sectional view of the related art taken along line XXB—XXB in FIG. 20A.

Pressure-sensitive resistor sensors are proposed as shown in FIGS. 19, 20A and 20B. These types of sensors have a bottom side film 110 formed with a bottom side electrode 100 and a top side film 210 formed with a top side electrode 200. The bottom side film 110 and the top side film 210 facing each other are spaced apart from each other by a predetermined distance by a spacer film 300 interposed between the bottom side film 110 and the top side film 210. When pressure is applied to the top side film 210, the central part of the top side film 210 is deformed downwardly as shown in FIG. 3 so that the top side electrode 200 contacts the bottom side electrode 100. As the applied pressure increases, the number of contact points and total contact area between the electrodes 100 and 200 increase, thereby changing a contact resistance between the electrodes 100 and 200.

The electrodes 100 and 200 of a proposed pressure-sensitive resistor sensor are both shaped in a planar disk as shown in FIG. 19. Alternatively, the electrodes 100 and 200 are shaped in comb teeth and a planar disk, respectively, as shown in FIGS. 20A and 20B. With this structure, the contact points between the electrodes 100 and 200 depend on the surface roughness of the electrodes 100 and 200. It is therefore difficult to control the number of contact points and total contact area uniformly among sensors. As a result, sensor output characteristics vary from sensor to sensor.

SUMMARY OF THE INVENTION

It is an object of the present invention to reduce deviation in contact resistance variation between electrodes among pressure-sensitive resistor sensors.

According to the present invention, one of a pair of films has a plurality of electrode portions and the other of the pair has at least one electrode portion that crosses the plurality of electrode portions on the one of the pair. Contact points generated by applied pressure are limited to crossing points between the electrode portions of the pair of films. Thus, the number of contact points and total contact area increase uniformly among sensors as the applied pressure increases.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENT

The present invention will be described in detail with reference to various embodiments and modifications.

(First Embodiment)

Figure 4:
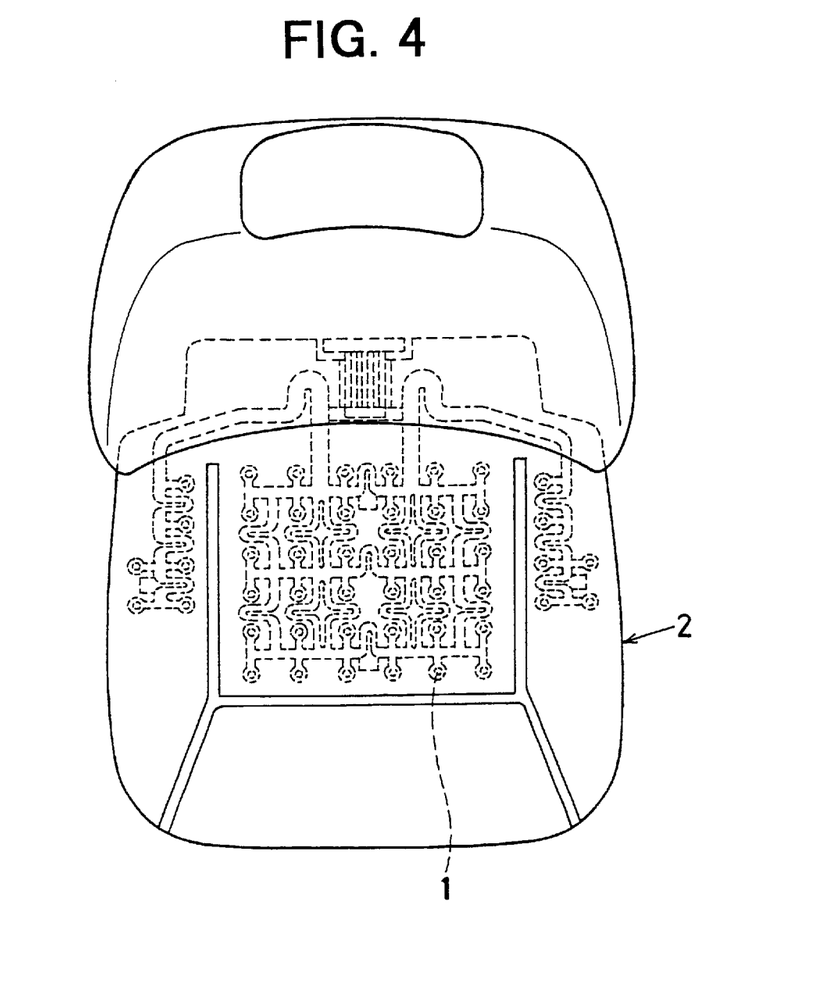
FIG. 4 is a plan view showing a seat sensor using the first embodiment.
Figure 5:
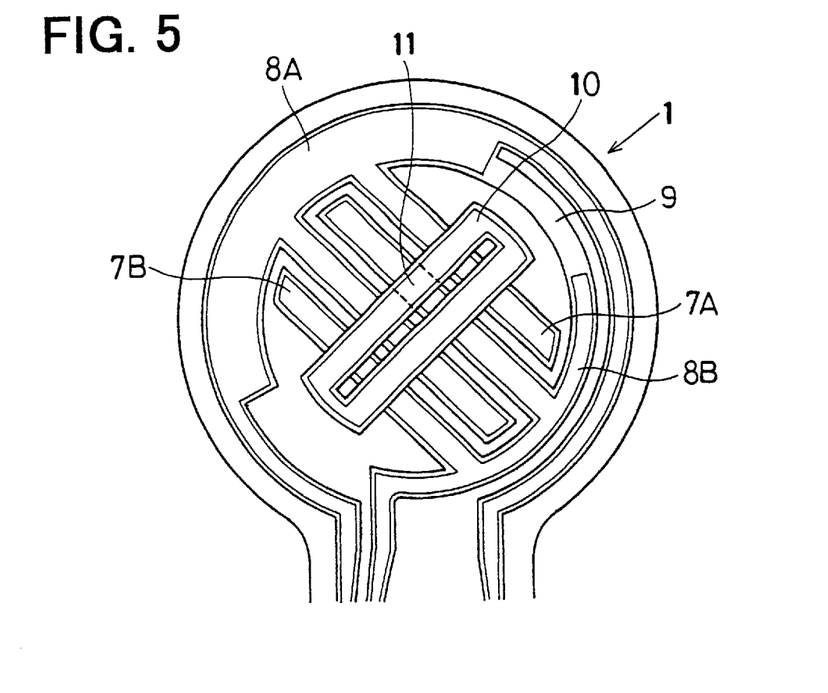
FIG. 5 is a plan view showing a first modification of the first embodiment.
Figure 6:
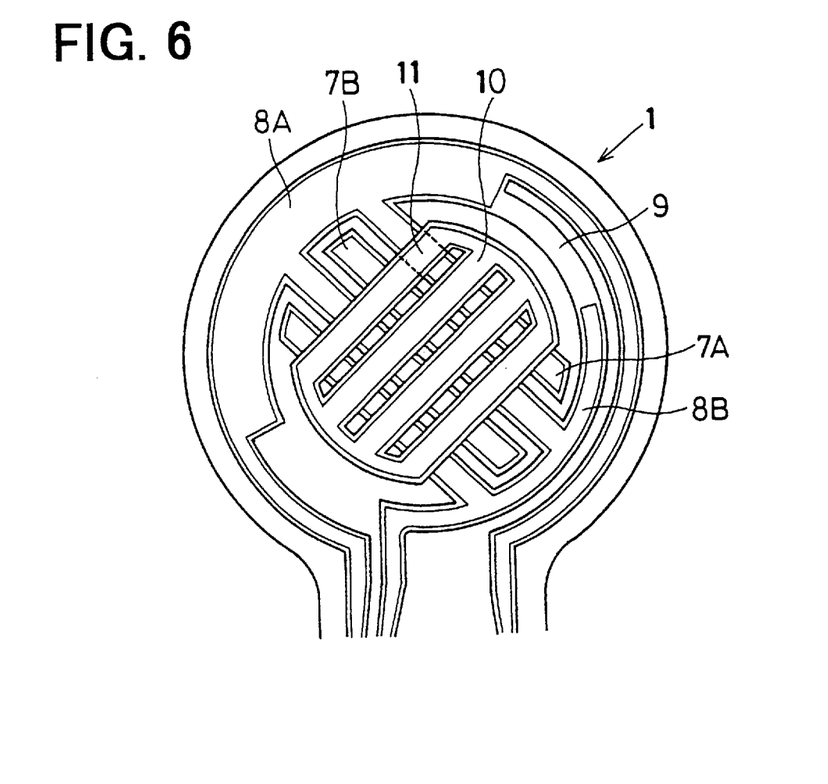
FIG. 6 is a plan view showing a second modification of the first embodiment.

A pressure-sensitive resistor sensor according to a first embodiment is shown in FIGS. 1A, 1B to FIG. 6 and indicated with reference numeral 1. A plurality of sensors 1 may be connected to each other and provided in a vehicle seat 2 as shown in FIG. 4 to operate as a seat sensor that detects the size of a passenger (adult or child) on the seat 2.

Figure 2A:
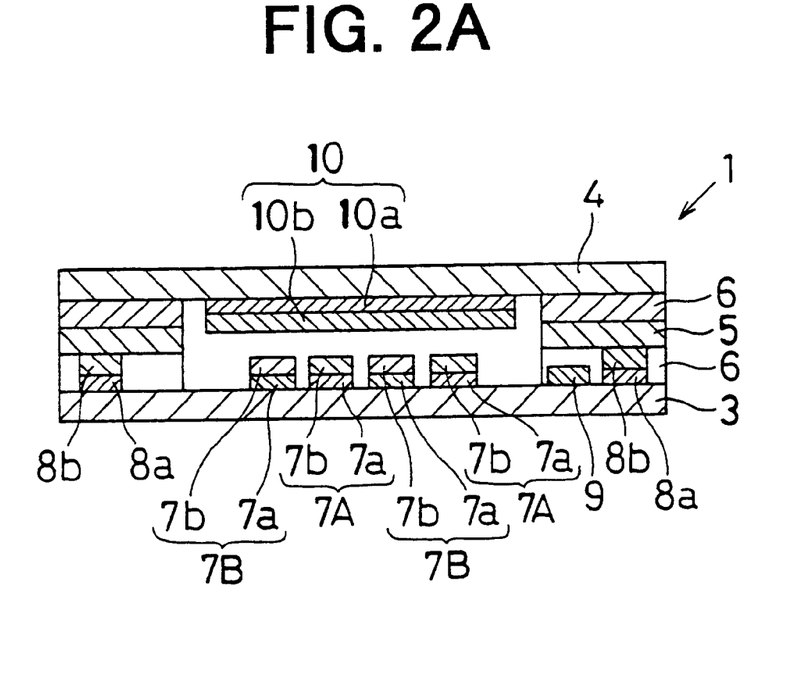
FIGS. 2A and 2B are cross-sectional views of the first embodiment taken along lines IIA—IIA and IIB—IIB in FIG. 1A, respectively.
Figure 2B:
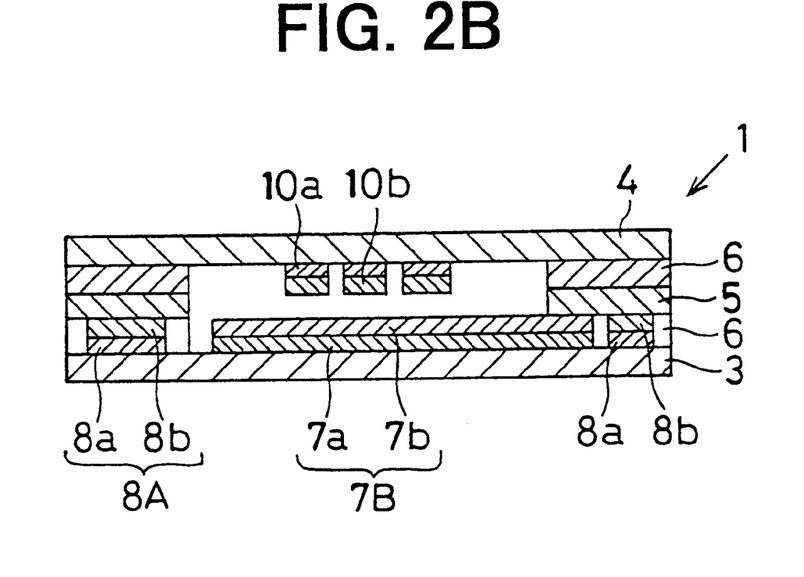

As shown in FIGS. 2A and 2B, each sensor 1 has a bottom side film 3 and a top side film 4 (for instance PEN films). The films 3 and 4 are attached to each other by an adhesive 6 with a spacer film 5 interposed between the films 3 and 4 to provide a predetermined clearance. The films 3 and 4 have bottom side and top side electrode layers, respectively, that face each other and are spaced apart from each other in the central part of the films 3 and 4.

Figure 1A:
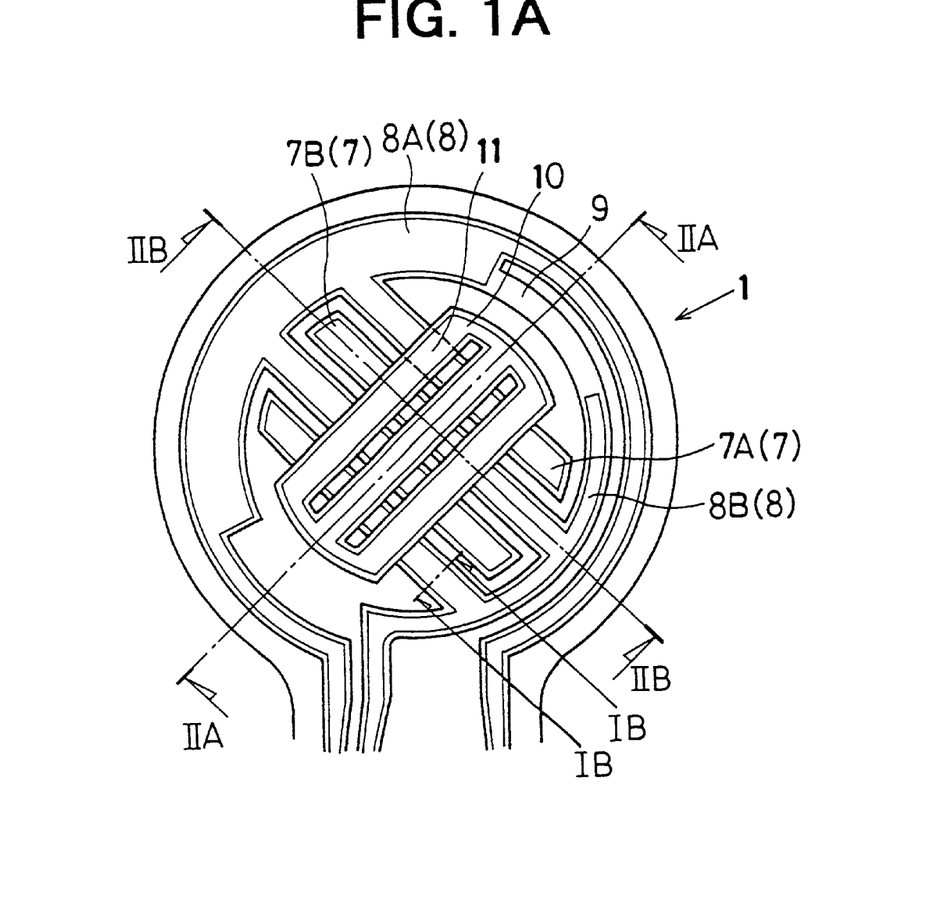
FIG. 1A is a plan view showing a first embodiment of a pressure-sensitive resistor sensor of the present invention.

As shown in FIG. 1A, the bottom side electrode layer comprises a plurality of linear (straight) electrodes 7 and arc-shaped electric leads 8 that are connected to the electrodes 7. The electrodes 7 comprise two positive side electrodes 7A and two negative side electrodes 7B that are both in a comb teeth shape. The number of positive side electrodes 7A and negative side electrodes 7B may be one, three or more. The electric leads 8 comprise positive side lead 8A and negative side lead 8B that face each other on the same circumference of a circle. The positive side electrodes 7A and the negative side electrodes 7B are aligned in parallel with each other with a predetermined clearance.

Figure 1B:
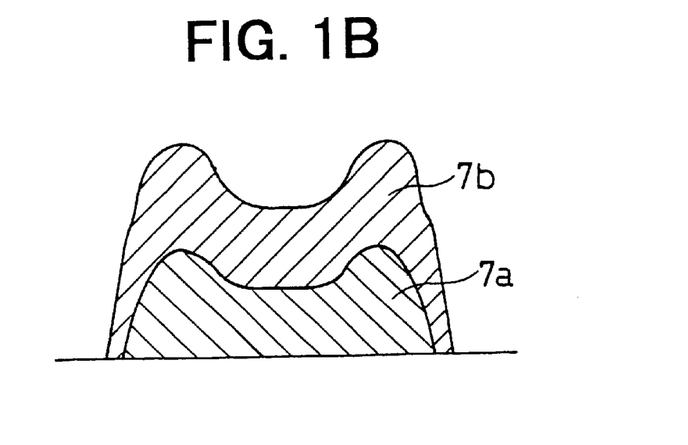
FIG. 1B is a cross-sectional view of an electrode portion of the first embodiment taken along line IB—IB in FIG. 1A.

The electrodes 7 and the electric leads 8 are formed by means of forming base layers 7a and 8a on the bottom side film 3 and forming thereon resistive layers 7b and 8b. A method to form the base layers 7a and 8a is screen-printing with Ag paste onto the surface of the bottom side film 3. A method to form the resistive layers 7b and 8b is screen-printing with a compound of conductive particles and resin or resistive resin on the top of the base layers 7a and 8a. As shown in FIG. 1A, The positive side lead 8A and negative side lead 8B are connected to each other with a resistive layer 9 comprising the resistive layer 8b (7b) to provide a function to detect an open circuit. As shown in FIG. 1B, the cross-sectional structure of the electrodes 7 and 10 is a twin-peak-mountain shape in the case that both electrodes 7 and 10 are formed with screen-printing and the widths of the electrode 7 and 10 are 1.5 mm, respectively.

The top side electrode layer shown in FIG. 1A comprises three linear (straight) electrodes 10. The electrodes 10 shown in FIG. 2A and FIG. 2B comprise base layers 10a on the top side film 4 and resistive layers 10b on the top of the base layers 10a to provide the same line width, e.g., 1.5 mm, as that of the bottom side electrodes 7. The base layer 10a and the resistive layer 10b are formed in the same way to form the bottom side electrode layer, i.e., a method to form the base layer 10a is screen-printing with Ag paste onto the surface of the top side film 4. A method to form the resistive layer 10b is screen-printing with a compound of conductive particles and resin or resistive resin on the top of the base layer 10a.

The electrodes 10 are aligned in parallel with each other in a predetermined clearance. Each end of the electrodes 10 is connected to other ends of adjacent electrodes in an arc shape to provide a closed circuit. The number of the electrodes 10 may be one, two, four or more. In modifications shown in FIG. 5 and FIG. 6, electrodes 10 have two and four electrodes, respectively. As shown in FIG. 1A, the bottom side and the top side electrode layers face each other in such way that each of the bottom side electrodes 7A and 7B is arranged in a transverse relation with the top side electrodes 10.

The operation and the advantage of the pressure-sensitive resistor sensor 1 are described as follows. As shown in FIG. 3, the central part of the top side film 4 is distorted downward and the top side electrodes 10 contact the bottom side electrodes 7 when the top side film 4 is pressed by pressure P. As shown in FIG. 1A, contact points between the bottom side electrodes 7 and the top side electrodes 10 are limited to a plurality of crossing points 11 between the electrodes 7 and 10.

Therefore, the number of contact points and total contact area in crossing points 11 increases as applied pressure increases. Applied pressure is measured by contact resistance shift due to changes in both the number of contact points and total contact area. In the case that this sensor structure is employed, contact points between the bottom side electrodes 7 and the top side electrodes 10 are limited to a plurality of crossing points 11 between the electrodes 7 and 10 so that variation in contact resistance due to applied pressure shift becomes more constant. As a result, it is possible to reduce deviation of contact resistance between the electrodes 7 and 10 among sensors and allow stable detection of applied pressure.

(Second Embodiment)

Figure 7A:
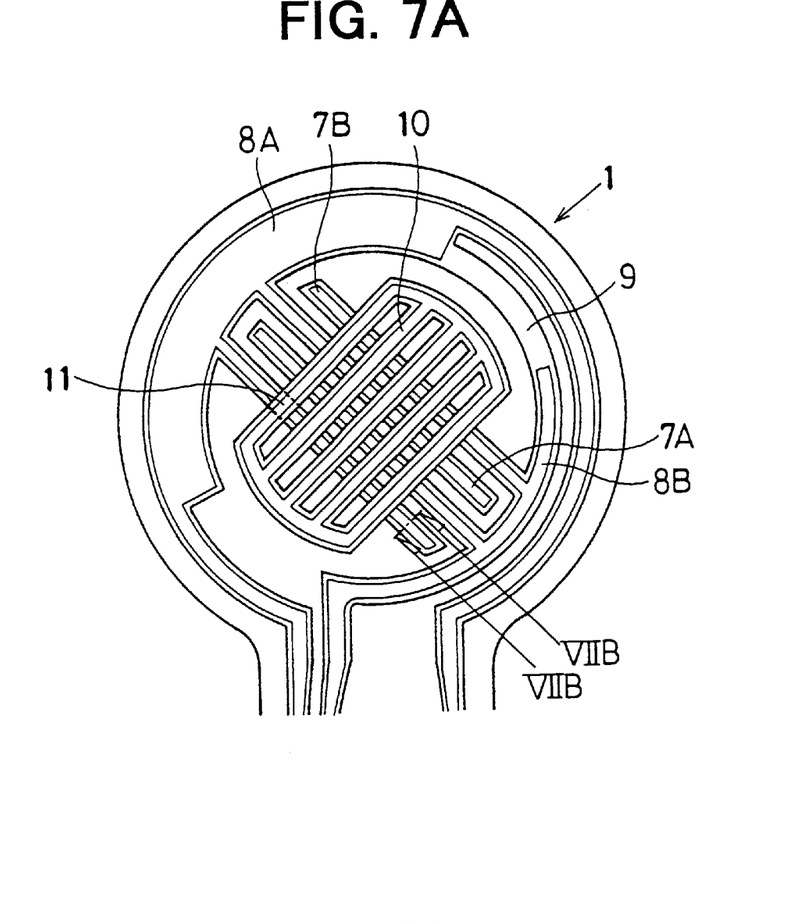
FIG. 7A is a plan view showing a second embodiment of a pressure-sensitive resistor sensor of the present invention.
Figure 7B:
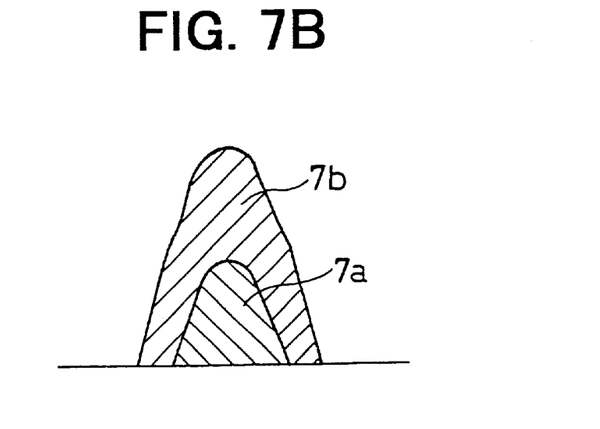
FIG. 7B is a cross-sectional view of an electrode portion of the second embodiment taken along line VIIB—VIIB in FIG. 7A.
Figure 8:
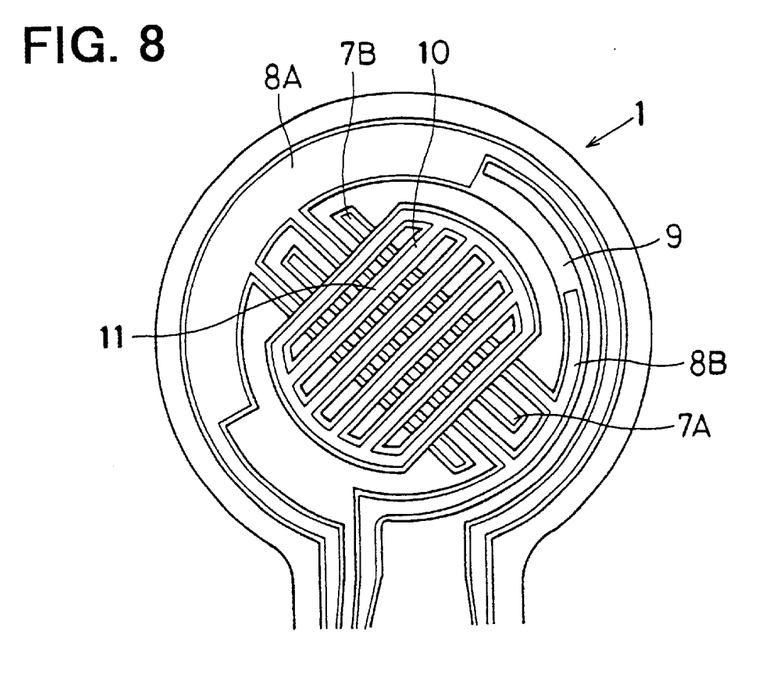
FIG. 8 is a plan view showing a first modification of the second embodiment.
Figure 9:
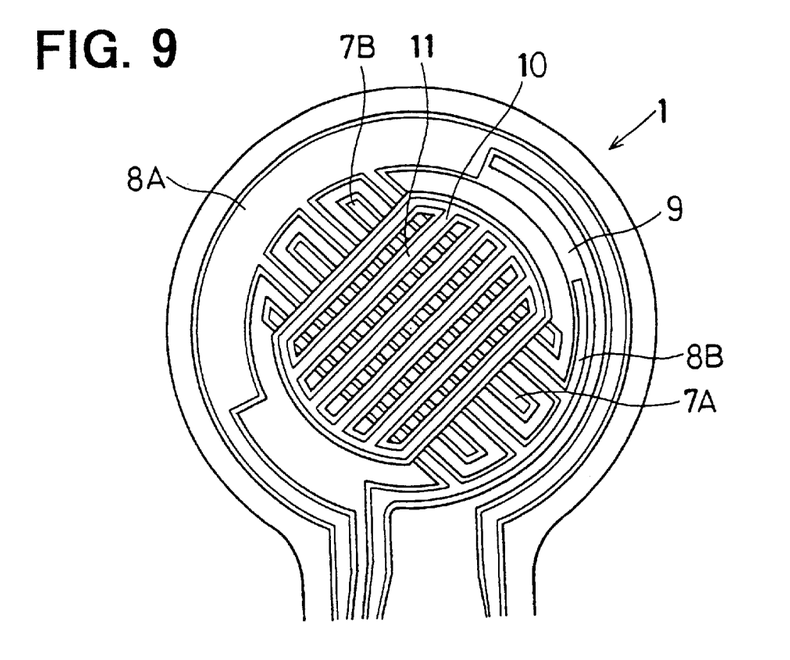
FIG. 9 is a plan view showing a second modification of the second embodiment.
Figure 10:
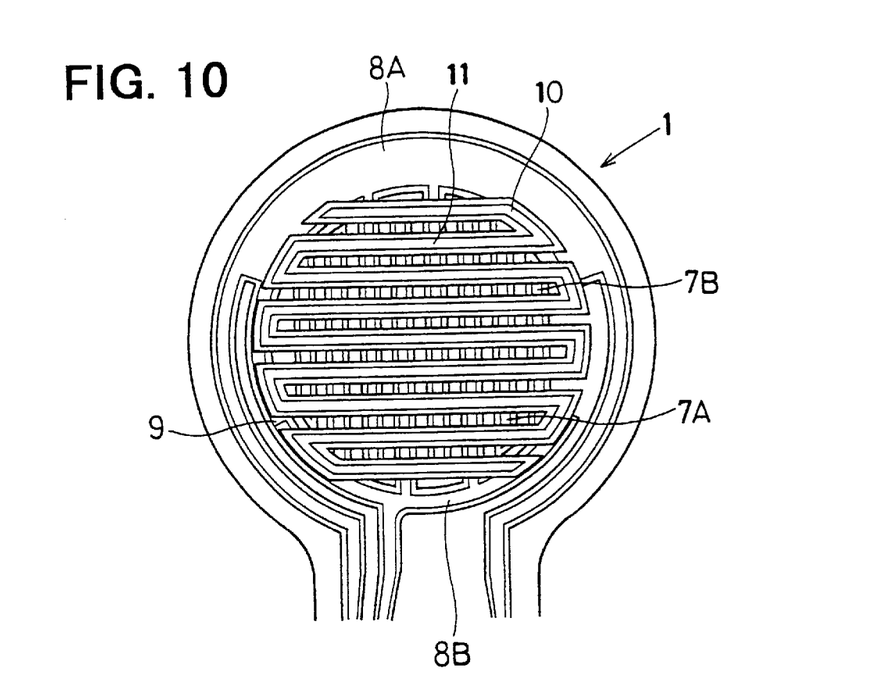
FIG. 10 is a plan view showing a third modification of the second embodiment.
Figure 11:
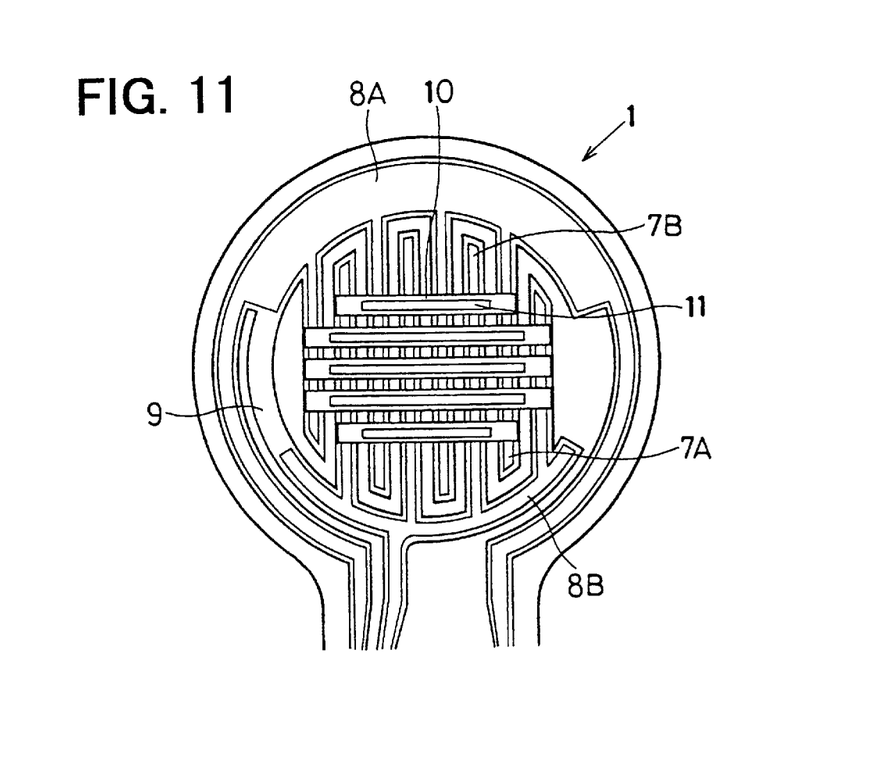
FIG. 11 is a plan view showing a fourth modification of the second embodiment.
Figure 12:
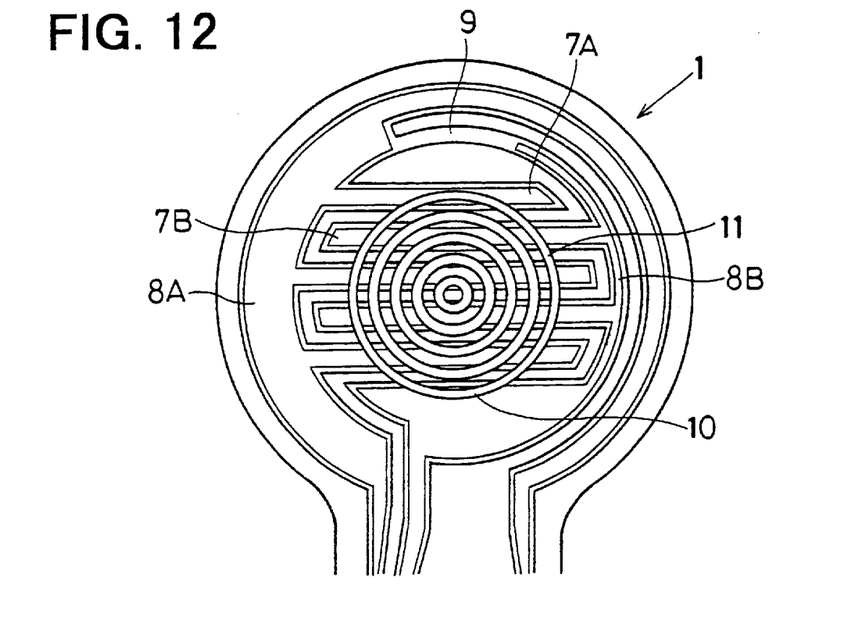
FIG. 12 is a plan view showing a fifth modification of the second embodiment.

In this embodiment of pressure-sensitive resistor sensor 1, each of the electrodes 7 and 10 have a different width from that in the first embodiment. In FIGS. 7 to 12, each of the electrodes 7 and 10 have 0.9 mm width. With this width, the cross-sectional structure of the electrodes 7 and 10 becomes a single-peak-mountain shape as shown in FIG. 7B. In a modification shown in FIG. 12, the top side electrode layer has a plurality of circular electrodes 10 that are different from each other in diameter and arranged in a concentric shape. In this modification, contact points between the bottom side electrodes 7 and the top side electrodes 10 also are limited to a plurality of crossing points 11 between the electrodes 7 and 10 so that the same effect as that in the first embodiment is provided.

Figure 13A:
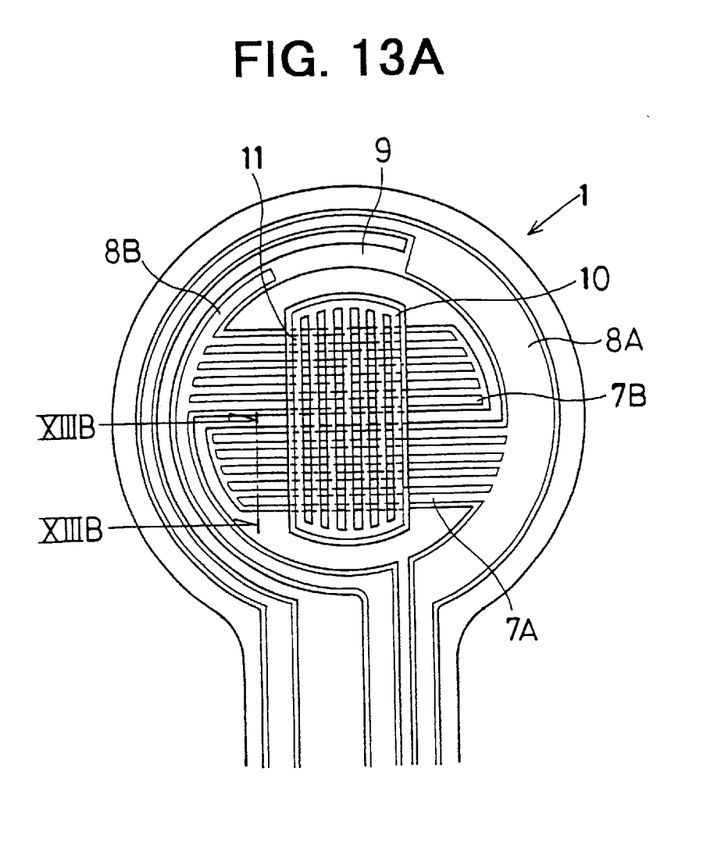
FIG. 13A is a plan view showing a sixth modification of the second embodiment.
Figure 13B:
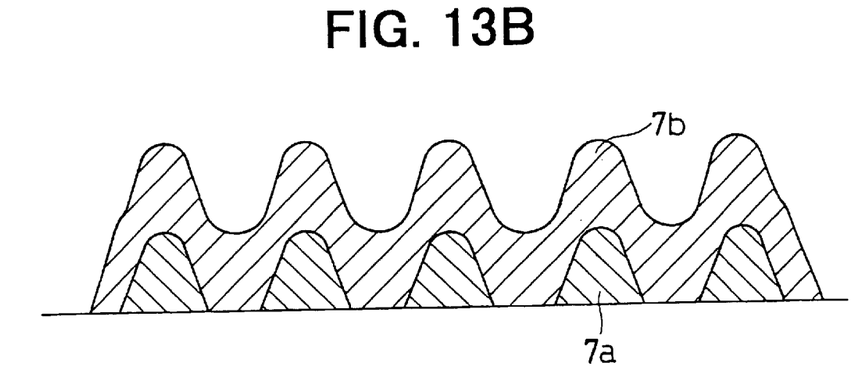
FIG. 13B is a cross-sectional view of an electrode portion of the sixth modification of the second embodiment taken along line XIIIB—XIIIB in FIG. 13A.
Figure 14:
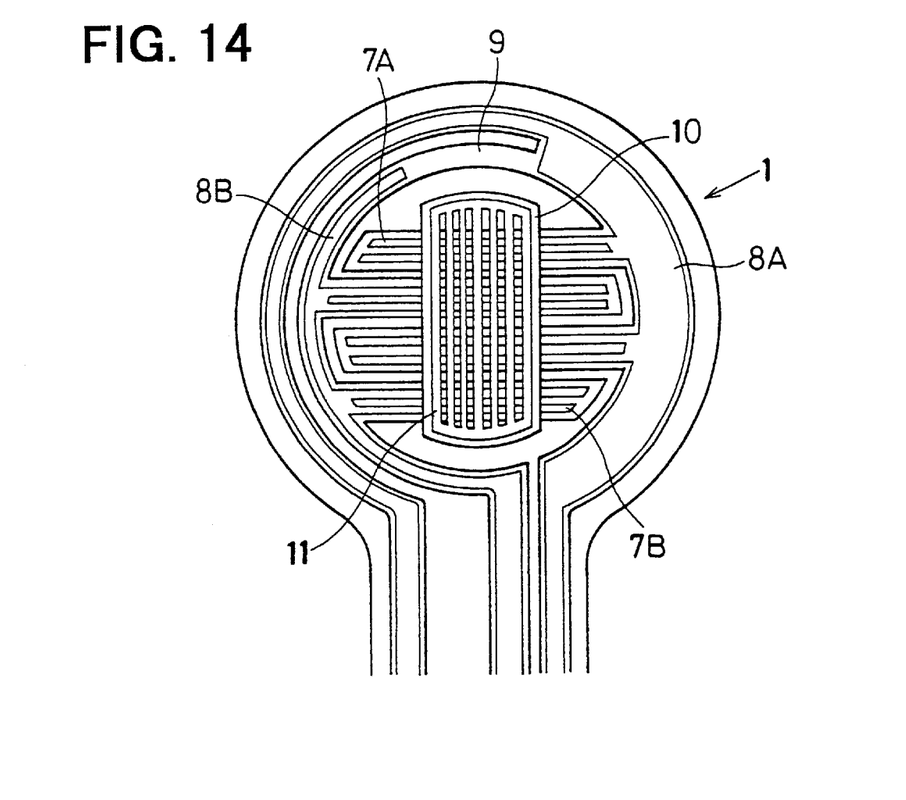
FIG. 14 is a plan view showing a seventh modification of the second embodiment.

In a modification shown in FIGS. 13A, 13B and 14, at the positive side electrodes 7A and the negative side electrodes 7B of the bottom electrode layer, a common resistive layer 7b is formed to cover a plurality of base layer 7a in the case that the width of the electrodes 7 becomes narrower, e.g., 0.5 mm. With this width, the cross-sectional structure of the electrodes 7A and 7B becomes a quintuple-peak-mountain shape as shown in FIG. 13B.

(Third Embodiment)

Figure 15:
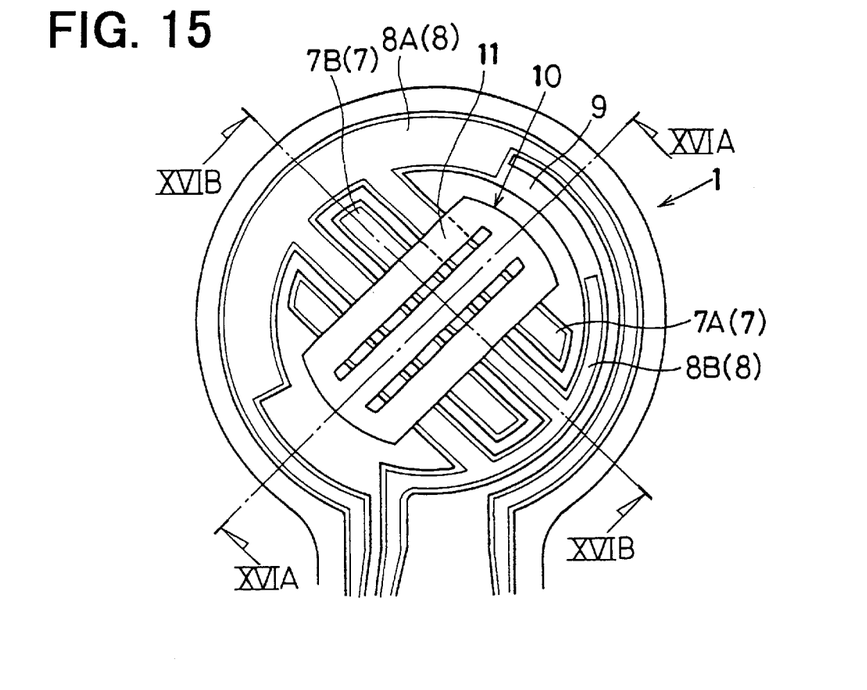
FIG. 15 is a plan view showing a third embodiment of a pressure-sensitive resistor sensor of the present invention.
Figure 16A:
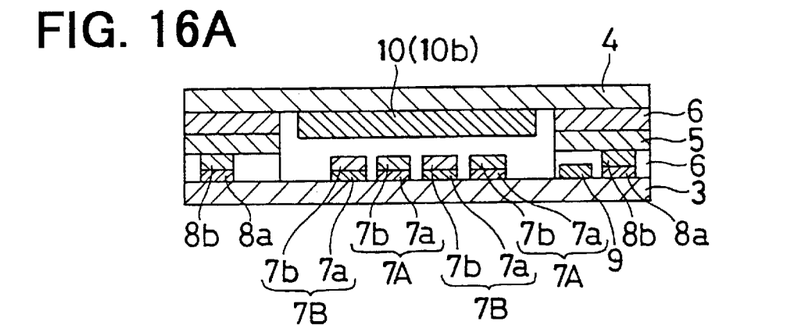
FIGS. 16A and 16B are cross-sectional views of the third embodiment taken along lines XVIA—XVIA and XVIB—XVIB in FIG. 15, respectively.
Figure 16B:
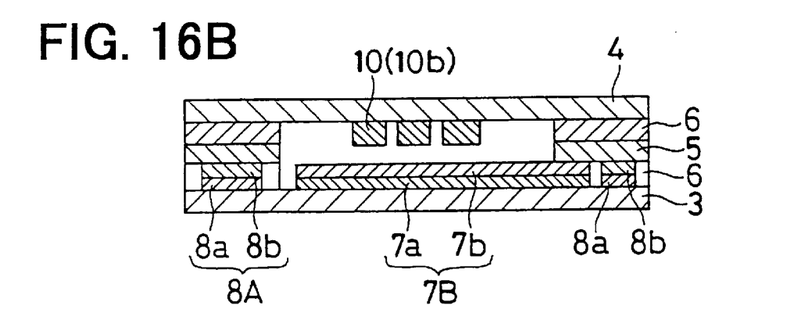

In a third embodiment of the pressure-sensitive resistor sensor shown in FIGS. 15, 16A and 16B, the base layer 10a of the top side electrodes 10 in both the first embodiment and the second embodiment is removed and the top side electrodes 10 comprise only the resistive layer 10b. In this embodiment, surface roughness of the top side electrodes 10 (the resistive layer 10b) is homogenized so that contact resistance with the bottom side electrodes 7 becomes more stable. As a result, the deviation of contact resistance between the electrodes 7 and the electrodes 10 among sensors can be more reduced.

(Fourth Embodiment)

Figure 17:
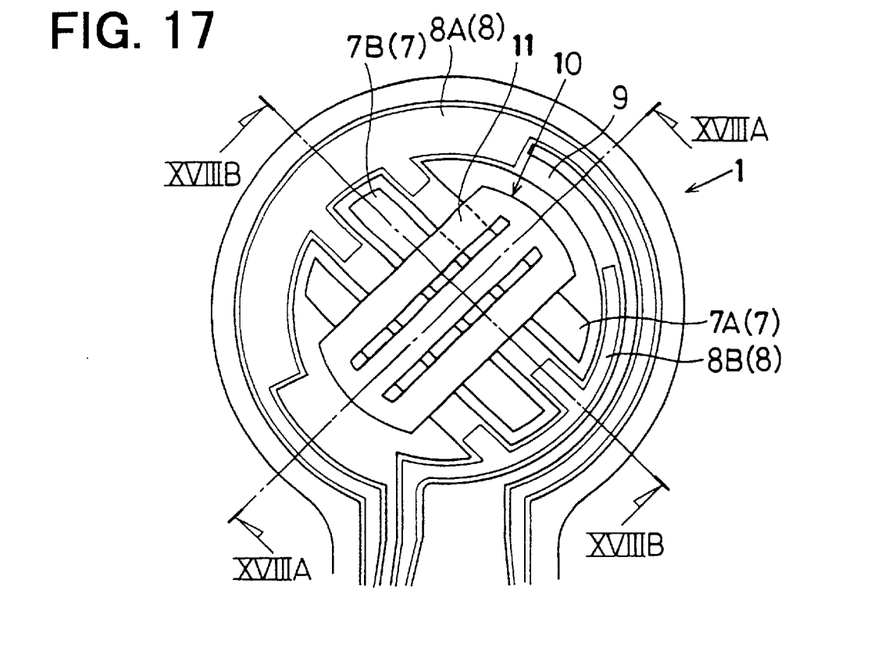
FIG. 17 is a plan view showing a fourth embodiment of a pressure-sensitive resistor sensor of the present invention.
Figure 18A:
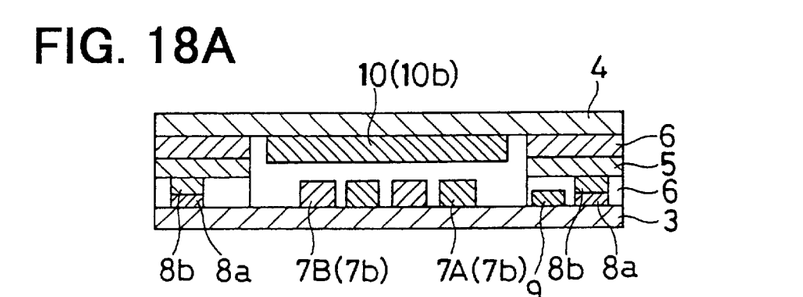
FIGS. 18A and 18B are cross-sectional views of the fourth embodiment taken along lines XVIIIA—XVIIIA and XVIIIB—XVIIIB in FIG. 17, respectively.
Figure 18B:
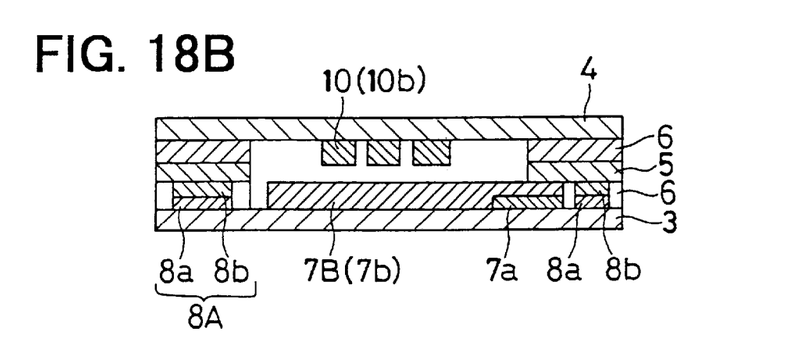

In a fourth embodiment shown in FIGS. 17, 18A and 18B, both the base layer 10a of the top side electrodes 10 and the base layer 7a of the bottom side electrodes 7 in both the first embodiment and the second embodiment are removed and both the topside electrodes 10 and the bottom side electrodes 7 comprise only resistive layer 7b and 10b, respectively. In this embodiment, surface roughness of both the top side electrodes 10 (the resistive layer 10b) and the bottom side electrodes 7 (the resistive layer 7b) is homogenized so that contact resistance between both the electrodes 7 and 10 becomes furthermore stable. As a result, the deviation of contact resistance between the electrodes 7 and 10 among sensors can be furthermore reduced.

What is claimed is:

1. A pressure-sensitive resistor sensor comprising:
   a first film having a first electrode layer; and
   a second film having a second electrode layer, the second electrode layer being spaced apart from the first electrode layer by a predetermined distance and facing the first electrode layer, wherein the first electrode layer is formed with a plurality of first electrode portions including a plurality of positive side electrode portions arranged in parallel with each other in a comb-shaped configuration and a plurality of negative side electrode portions arranged in parallel with each other in a comb-shaped configuration, the positive side electrode portions and the negative side electrode portions being interleaved with one another with a predetermined clearance defined therebetween;

the second electrode layer being formed with a plurality of concentrically arranged second electrode portions;

each of the positive side electrode portions and each of the negative side electrode portions respectively cross over any one of the plurality of second electrode portions to form a plurality of crossing points; and the second electrode portions are arranged to electrically contact the positive side electrode portions and the negative side electrode portions upon application of pressure thereto to short the positive side electrode portions and negative side electrode portions.

2. The pressure-sensitive resistor sensor as in claim 1, wherein each of the first and second electrode portions comprises a single-peak electrode portion.

3. A pressure-sensitive resistor sensor comprising:

a first film having a first electrode layer; and a second film having a second electrode layer spaced apart from the first electrode layer by a predetermined distance and facing the first electrode layer, wherein the first electrode layer is formed with first electrode portions each arranged in a first direction, and the second electrode layer is formed with second electrode portions arranged in a second direction transverse to the first direction of the first electrode portions, the first electrode portions each including a positive side base, a negative side base, a positive side electrode portion connected to the positive side base and a negative side electrode portion connected to the negative side base; and the second electrode portions being arranged to electrically contact the positive side electrode portion and the negative side electrode portion of the first electrode portions upon application of pressure thereto to short the positive side base and the negative side base.

4. The pressure-sensitive resistor sensor as in claim 3, wherein:

the second electrode portions of the second electrode layer each include a base and a resistive part formed on the base.

5. The pressure-sensitive resistor sensor as in claim 3, wherein:

the second electrode portion is of the second electrode layer each include a resistive part without a base.

6. The pressure-sensitive resistor sensor as in claim 3, wherein:

one of the first electrode portions includes a base and a resistive part located on the base, wherein the base extends from the positive side base and the negative side base.

7. The pressure-sensitive resistor sensor as in claim 3, wherein:

each of the first electrode portions of the first electrode layer includes a resistive part without a base.

8. The pressure-sensitive resistor sensor as in claim 3, wherein at least the first electrode portions comprise double-peak electrode portions.

9. The pressure-sensitive resistor sensor as in claim 3, wherein at least the first electrode portions comprise single-peak electrode portions.

10. The pressure-sensitive resistor sensor as in claim 3, wherein at least the first electrode portions comprise multiple-peak electrode portions.

11. A pressure-sensitive resistor sensor comprising:

a first film having a first electrode layer formed with first electrode portions extending in a first direction;

a second film having a second electrode layer spaced apart from the first electrode layer by a predetermined distance and facing the first electrode layer, wherein the first electrode layer is formed with a plurality of first electrode portions;

the first electrode portions include a plurality of positive side electrode portions arranged in parallel with each other in a comb-shaped configuration and a plurality of negative side electrode portions arranged in parallel with each other in a comb-shaped configuration;

the positive side electrode portions and the negative side electrode portions interleave with each other with a predetermined clearance therebetween;

the second electrode layer is formed with a plurality of second electrode portions arranged in a second direction transverse to the first direction;

each of the positive side electrode portions and each of the negative side electrode portions cross over any one of the second electrode portions at to form a plurality of crossing points; and the second electrode portions are arranged to electrically contact the positive side electrode portions and the negative side electrode portions upon application of pressure thereto to short the positive side electrode portions and negative side electrode portions.

12. The pressure-sensitive resistor sensor as in claim 11, wherein each of the first and second electrode portions comprises a double-peak electrode portion.

13. The pressure-sensitive resistor sensor as in claim 11, wherein each of the first and second electrode portions comprises a single-peak electrode portion.

14. The pressure-sensitive resistor sensor as in claim 11, wherein each of the first and second electrode portions comprises a multiple-peak electrode portion.

15. A pressure-sensitive resistor sensor comprising:

a first film having a first electrode layer; and a second film having a second electrode layer spaced apart from the first electrode layer by a predetermined distance and facing the first electrode layer, wherein the first electrode layer is formed with first electrode portions each arranged in a direction, the second electrode layer is formed with a plurality of concentrically arranged electrode portions, each of the first electrode portions includes a positive side base, a negative side base, a positive side electrode portion connected to the positive side base, and a negative side electrode portion connected to the negative side base, and the second electrode portions are arranged to electrically contact the positive side electrode portion and the negative side electrode portion of the first electrode portions upon application of pressure thereto to short the positive side base and the negative side base.

16. The pressure-sensitive resistor sensor as in claim 2, wherein the single-peak electrode portion is formed by screen-printing such that a cross-sectional shape of the single-peak electrode portion has a single peak.

17. The pressure-sensitive resistor sensor as in claim 13, wherein the single-peak electrode portion is formed by screen-printing such that a cross-sectional shape of the single-peak electrode portion has a single peak.

18. A pressure-sensitive resistor sensor comprising:
a first film having a first electrode layer formed with first electrode portions extending in a first direction;
a second film having a second electrode layer spaced apart from the first electrode layer by a predetermined distance and facing the first electrode layer,
wherein the second electrode layer is formed with second electrode portions arranged in a comb-shaped configuration in a second direction transverse to the first direction,
each of the first electrode portions cross over each of the second electrode portions at a plurality of respective crossing points, and
each of the first and second electrode portions comprises a double-peak electrode portion.

19. A pressure-sensitive resistor sensor comprising:
a first film having a first electrode layer formed with first electrode portions extending in a first direction;
a second film having a second electrode layer spaced apart from the first electrode layer by a predetermined distance and facing the first electrode layer,
wherein the second electrode layer is formed with second electrode portions arranged in a comb-shaped configuration in a second direction transverse to the first direction,
each of the first electrode portions cross over each of the second electrode portions at a plurality of respective crossing points, and
each of the first and second electrode portions comprises a multiple-peak electrode portion.

* * * * *